United States Patent [19]

Goldstein

[11] Patent Number: 5,446,734
[45] Date of Patent: Aug. 29, 1995

[54] TELECOMMUNICATIONS NETWORK WITH PLESIOCHRONOUS TRANSFER MODE

[75] Inventor: Fred R. Goldstein, Arlington, Mass.

[73] Assignee: Digital Equipment Corporation, Maynard, Mass.

[21] Appl. No.: 36,228

[22] Filed: Mar. 24, 1993

Related U.S. Application Data

[63] Continuation of Ser. No. 765,483, Sep. 25, 1991, which is a continuation of Ser. No. 509,563, Apr. 13, 1990, both abandoned.

[51] Int. Cl.⁶ .................... H04L 12/56; H04J 3/06
[52] U.S. Cl. .................... 370/60.1; 370/102; 370/112
[58] Field of Search ............ 370/94.1, 94.3, 95.1, 370/100.1, 102, 112, 94.2, 60.1, 60, 105.1; 340/825.5, 825.51

[56] References Cited

U.S. PATENT DOCUMENTS

| | | | |
|---|---|---|---|
| 4,317,196 | 2/1982 | Ulug | 370/60 X |
| 4,375,097 | 2/1983 | Ulug | 370/94.3 X |
| 4,594,708 | 6/1986 | Servel et al. | 370/94.1 |
| 4,698,802 | 10/1987 | Goke et al. | 370/94.1 |
| 4,763,321 | 8/1988 | Calvignac et al. | 370/94.1 X |
| 4,771,425 | 9/1988 | Baran et al. | 370/94.1 |
| 4,811,340 | 3/1989 | McEachern et al. | 370/102 |
| 4,833,671 | 5/1989 | Beckner et al. | 370/112 X |
| 4,873,684 | 10/1989 | Kobayashi et al. | 370/102 |
| 4,891,805 | 1/1990 | Fallin | 370/95.1 |
| 4,893,306 | 1/1990 | Chao et al. | 370/112 |
| 4,905,228 | 2/1990 | Angell et al. | 370/95.1 X |

Primary Examiner—Douglas W. Olms
Assistant Examiner—Hassan Kizou
Attorney, Agent, or Firm—Arnold, White & Durkee

[57] ABSTRACT

A telecommunications network of the type having links with long propagation delay uses an asynchronous transfer mode in which small, fixed-length blocks of information (cells) are transferred at very high speed. Each long-haul hop within the network is phase-locked to a fixed period, and time slots of a granularity of one cell are pre-allocated to the virtual circuits. The network operates in a near-synchronous (plesiochronous) manner. By pre-allocating cells, it is assured that the cells will not arrive at a faster rate than that at which each receiving node can forward them on to the next hop. When bursts of heavy traffic occur, the network responds by slowing or limiting access, rather than by loss of data at intermediate nodes due to buffer overflow.

17 Claims, 5 Drawing Sheets

TELECOMMUNICATIONS NETWORK WITH PLESIOCHRONOUS TRANSFER MODE

RELATED CASE

This application is a continuation of application Ser. No. 765,483, filed Sep. 25, 1991 (now abandoned), which was a continuation of application Ser. No. 509,563, filed Apr. 13, 1990 (now abandoned).

This application discloses subject matter also disclosed in application Ser. No. 509,605, filed herewith, entitled "Congestion Avoidance in High-Speed Network Carrying Bursty Traffic," U.S. Pat. No. 5,029,164 assigned to Digital Equipment Corporation.

BACKGROUND OF THE INVENTION

This invention relates to telecommunications networks, and more particularly to a time-slotted, preallocated, high-speed link in a network where this link exhibits a long propagation delay.

Broadband ISDN (integrated services digital network) systems are prone to severe buffer overflow problems at intermediate nodes. Data is thus lost and must be retransmitted, reducing the reliability and capacity of the system. These losses are referred to as congestion loss, but this is not the result of an under-engineered network. Instead, this type of congestion is an inevitable result of the probabilistic and bursty nature of data in asynchronous (packetized) information transfer.

In narrowband packet networks, feedback control mechanisms are able to manage the traffic load so that buffer overflow can be mostly avoided, or at least controllable. For example, networks based upon the so-called X.25 protocol provide two levels of flow control; one controls all traffic across the physical link, and another layer controls traffic across one virtual circuit. Each layer's protocol provides both a window-based flow manager and a stop/go control mechanism. That is, a node having data to send is only allowed to send a fixed amount of data before being granted permission to continue, and, in addition, the node can be shut off for a time period when capacity is all allocated.

Connectionless networks, such as those using certain DECnet and DDN Internet Protocol, do not have positive controls as in X.25, but still provide definite feedback mechanisms. For example, "implicit" feedback mechanisms focus on sequence numbers in the packets; if a packet is dropped (as may be inferred from a gap in acknowledged sequence numbers) it may be determined that congestion is severe and so the sender drastically reduces its sending rate (as by reducing the window size). Or, "explicit" mechanisms provide warning of incipient congestion, so that senders can usually reduce their rate before any packets are lost; thus there is still feedback, but the data terminals are more responsible for responding to it.

Broadband asynchronous transfer mode (ATM) networks often have links that span large distances, thousands of miles in many cases. Here the propagation delay is too long to allow feedback to be effective. The delay from the time a packet is sent to the time it is received at the destination is much longer than the time during which congestion can cause buffers to fill in intermediate nodes, so data is lost. By the time the loss is recognized and a feedback signal sent back to the sender, it is too late to alter the sending rate or otherwise change the input to prevent congestion.

It is not sufficient to use any of the common feedback schemes, including credit managers, windows, etc., across long-delay ATM networks. While some of these techniques are quite appropriate for short-haul ATM applications, they lose effectiveness when the buffer fill time falls well below the propagation delay in the link. The exact point at which feedback delay becomes unacceptable depends upon the degree of burstiness of the traffic; if the bulk of traffic is constant, then a somewhat longer delay can be tolerated before loss occurs. Highly bursty traffic is more sensitive.

In a typical network, therefore, two types of allocation are needed. A simple credit-based buffer allocation scheme is likely to be quite adequate for certain applications—those links that have short propagation delay. The receiving end of each link monitors the buffers available to each virtual path and/or virtual channel and grants credits to the sending end. This may be somewhat cumbersome when the number of virtual paths is quite high, but in practice credits are allocated back to each virtual path or channel based upon availability of buffers for the links going out of the node. Some amount of receive buffer may be useful in order to permit a node to accept all traffic arriving at one incoming link when there is a disparate buffer fill situation at its outgoing links. Nonetheless, this transmission discipline is simply a form of conventional hop-by-hop management, and is not dis-similar from what is found on conventional connection-oriented packet networks. These links do not need a more complex scheme such as is described below. A more complex discipline is required when the dimensions of the network cause propagation delays to become longer than allowable feedback times.

There are two causes of congestion loss, funnelling and mismatch. A packet-switched network can lose its protocol data units (cells, frames or packets) when the arrival rate at any given point exceeds the departure rate for a long enough period of time that a buffer overflows. This can occur for either of two separate and identifiable reasons. Funneling loss occurs when several different paths converge on a single buffer, and traffic bursts arrive closely spaced in time, such that overflow occurs. Funneling is generally transient. Mismatch occurs when sustained demand for a given facility exceeds its capacity; for example, when a high-speed link meets a lower-speed link, or when an additional virtual circuit is created over a busy facility. A congestion management scheme must be able to handle both mismatch and funneling. However, deferent techniques tend to be more effective for one or the other. Admission control policies, coupled with stringent network-wide resource allocation and a minimum of oversubscription, can minimize mismatch. Connectionless networks require feedback to control mismatch loss, as they rarely if ever provide rate-based control. Traditional packet networks are usually rather tolerant of funneling loss. An occasional dropped packet can be recovered. ATM networks, however, may use protocols that are prone to loss multiplication; a single dropped cell can corrupt an entire packet, if frame-based recovery is used. Some ATM applications, such as circuit emulation, are intolerant of any cell loss. Thus, funneling effects are far more severe in an ATM context, and are hardest to solve.

It has been suggested that by limiting the rate at which users are allowed to send data into an ATM network (i.e., access control) such that the total bandwidth of all channels does not exceed the cross-sectional size of any trunk facility, then congestion will not occur. This is not true, however, when the traffic is bursty. While bursts in an ATM network may be individually bounded in size and rate, a probability exists that at any given time the amount of traffic arriving for any given buffer will exceed the capacity of that buffer, even if the average is not excessive.

The funneling effect is particularly severe when many small virtual channels are provided. If the number of virtual channels exceeds the number of cells in a buffer, then it is statistically possible that many of them send their cells at such times that the bursts arrive at a given buffer close enough in time that the buffer overflows. The total "event horizon" within an ATM network is no greater than the longest round-trip delay including buffer times. Thus, even circuits with a "reserved" throughput class (enforced at the access) of, say, 64-kbps, who are thus allowed to issue one cell (with a 48-octet payload) every 6-ms., can send those cells anywhere within the 6-ms. window, and indeed it is more likely that senders will be allowed to accumulate credits so that larger bursts may be sent with less frequency.

It can therefore be shown that no access control scheme can positively prevent buffer overflow. If ATM networks are to use loss-sensitive protocols, then a different mechanism is required to prevent cell loss. Such a mechanism must actively counter the bursty nature of ATM traffic, to reduce peak buffer occupancy and thus the chance of overflow.

Continuous bit rate services are in this respect little different from variable bit rate services, because typical variable bit rate user variations in rate occur over a time period that is quite long, compared to sub-millisecond buffer fill times. Variable bit rate is thus handled by treating it as a special case of continuous bit rate, in which the bit rate is changed on occasion. Most bursty data applications can tolerate delays in the 100-ms. range; if reallocation of bandwidth takes this long, applications and users will typically not notice.

Circuit-switched digital networks (including narrow bandwidth integrated services digital networks) typically make use of synchronous time division multiplexing to allocate bandwidth on trunk facilities; in this method, individual channels are separated by their position within a stream. Some bandwidth is required for framing purposes, but individual channels have no overhead of their own. Asynchronous transfer mode (ATM) is, in effect, "asynchronous time division multiplexing", where individual channels are identified by label, instead of by position within the stream. Asynchronous transfer mode is thus more akin to packet mode in operation, although it operates below the data link layer and does not provide the same services as narrowband packet networks.

Because the bursty nature of ATM will necessarily result in buffer overflow in heavily-loaded (but not necessarily oversubscribed) networks with long-delay physical facilities, buffer management (i.e., congestion avoidance) requires a redefinition of the problem, as addressed by the present invention.

SUMMARY OF THE INVENTION

According to a feature of the invention, a technique is described herein that is compatible with asynchronous transfer mode, uses ATM-type labeled cells and provides similar services, but is not completely asynchronous; this technique is referred to herein as plesiochronous transfer mode or PTM. This transfer mode is applicable to both continuous bit rate and variable bit rate applications.

The plesiochronous transfer mode provides services like asynchronous transfer mode but with much lower (albeit non-zero) probability of cell loss. This mode is intended for use on long-delay links within ATM networks.

The plesiochronous transfer mode uses cells like asynchronous transfer mode, but prevents buffer overflows by pre-allocating bandwidth. Like synchronous time division multiplexing, time slots are used, but here the slots are one cell wide and labeled with cell headers. Slotting is thus used solely as a buffer management and congestion control mechanism.

The operation of a plesiochronous transfer mode link is similar to that of a phase locked loop, with each PTM link operating with a fixed frequency (periodicity). Within each PTM link, a fixed number of slots, each carrying one ATM cell, is provided. Individual virtual channels are assigned slots, based upon the required bandwidth. Because operation is plesiochronous (near-synchronous) and not synchronous, buffering is still required.

In accordance with one embodiment of the invention, a telecommunications network of the type having long-delay links employs an asynchronous transfer mode in which small, fixed-length blocks of information (cells) are transferred at very high speed. Each long-haul hop within the network is phase-locked to a fixed period, and time slots of a granularity of one cell are pre-allocated to the virtual circuits. This network operates in a near-synchronous (plesiochronous) manner. Each hop-to-hop loop occurring at a given time is assigned to one or more virtual circuits, each identified by a header for cells carrying this data. By pre-allocating cells, it is assured that the cells will not arrive at a faster rate than that at which each receiving node can forward them on to the next hop. When bursts of heavy traffic occur, the network responds by buffering or limiting access (i.e., narrowing a window allotted to a source), rather than by loss of data at intermediate nodes due to buffer overflow.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Figure 1:
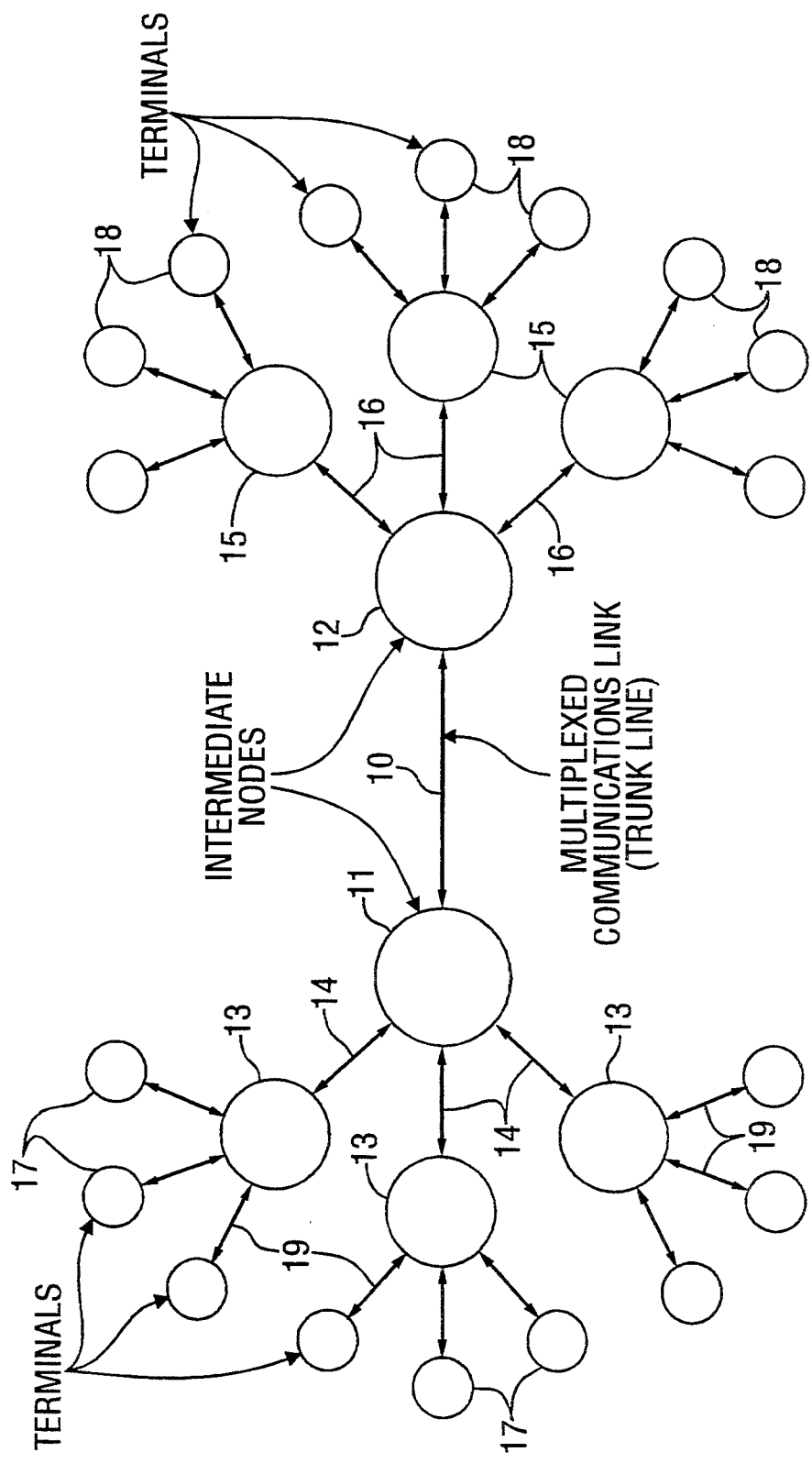
FIG. 1 is an electrical diagram in block form of a communications network in which one embodiment of the invention may be utilized.

Referring to FIG. 1, a communications network is illustrated having a communications link 10 between a pair of nodes 11 and 12. The link 10 is a trunk facility, where the link 10 must carry traffic between a large number of nodes 13 connected to the node 11 by links 14 and a large number of nodes 15 connected to the node 12 by links 16. In turn, the nodes 13 and 15 are connected to other nodes 17 and 18. Thus, because of the fan-in of a number of nodes to the nodes 11 and 12, the link 10 must have much greater capability than the link 19 between nodes 13 and 17, for example. The link 10 may be a satellite link, or fibre optic link, which may span hundreds or thousands of miles, and would have a speed of perhaps 150- or 600 Mbit/sec or more, i.e., broadband. The links between nodes 11, 13 and 17 (or 12, 15 and 18), however, may be broadband facilities operating at perhaps 150- or 600-Mbps, or other speeds, or may be narrowband facilities, i.e., 64000-bps.

The network of FIG. 1 may carry both voice and data, with the voice messages being in digital format, so the network may be of the ISDN or integrated services digital network type. Voice channels are characterized by constant bit rate transmission at 6400-bps, or other speed, or by bursts of information separated by silence, at a rather low bandwidth. Thus, a large number of channels may be funneled through a broadband trunk facility such as the link 10 of FIG. 1. Digital channels send data at a constant bit rate or in bursts rather than continuous.

While the link 10 is broadband, there is nevertheless a limit on the amount of traffic it can handle, so some type of control on access by the nodes must be imposed. A simple method of control would be to determine the number of nodes in the entire network at a given time and divide the available bandwidth equally (introducing priorities if needed). However, this method would not take advantage of the statistical gain inherent in a shared data path; many or most of the nodes would not be using their allotted bandwidth at a given moment, so much of the network capacity would be sitting idle while some nodes needing heavy message traffic would be delayed in their operation. Oversubscribing to take advantage of the statistical gain, however, results in congestion at times of heavy traffic, with loss of data due to buffers filling up at intermediate nodes.

It has been found advantageous to employ an asynchronous transfer mode (ATM) in networks of the type seen in FIG. 1. That is, the data flow in the link 10 is buffered at nodes 11 and 12 and transmissions are not necessarily synchronized with the originating node 17 or 18. A block of the 9600-bps data from a node 17 may be buffered at node 11 and sent to node 12 at 150- or 600-Mbps (depending upon the network construction) when it is convenient for the node 11 to do so (unrelated to the clock used by the node 17 to send data to the node 13, or by the node 13 to send data to node 11), yet the data rate of the trunk facility is so high that no delay is perceptible at the originating node 17.

The time delay inherent in the link 10 may be too long to allow any meaningful feedback from the node 11 to the node 12 about the receive conditions. If the link 10 is a satellite link, this delay would be several hundred milliseconds. If the link 10 is fibre optic, then the speed of transmission is about 200 km/msec., so a link across the continent creates a delay of many milliseconds, which is still too long for feedback to be effective. If the node 11 had a buffer for each of its egress ports 14 of a size of 150 cells, for example, where each cell is 424 bits (53 octets) long, and the link 10 had a payload of 150-Mbps, then it a two-to-one mismatch occurred at one buffer (one of the ports links 14) this buffer would go from empty to full in about $(150 \times 424)/(1.5 \times 10^5) = 0.424$ milliseconds. It is thus seen that a feedback scheme for control of traffic flow would be inadequate when propagation time delays measured in milliseconds are prevalent. A fundamental rule of control theory is that feedback, to be effective, must be received quickly enough so that response can be timely; delayed too much, feedback will not have the desired effect. In broadband communications networks using asynchronous transfer mode, as discussed with reference to FIG. 1, operating over wide area topology, the event being controlled (a buffer filling up at a destination or at some intermediate point) can occur before the feedback (traveling at the speed of light, or at the signal speed in the medium in question) can reach the source node (the point to be controlled).

Thus, due to the vast difference in propagation delays among the links in FIG. 1, the plesiochronous transfer mode as herein described might be used for the link 10 which is long-delay, while credit-based ATM (i.e., a shutter or "loose window") is used for the short-delay links 14 or 16, for example.

Figure 2:
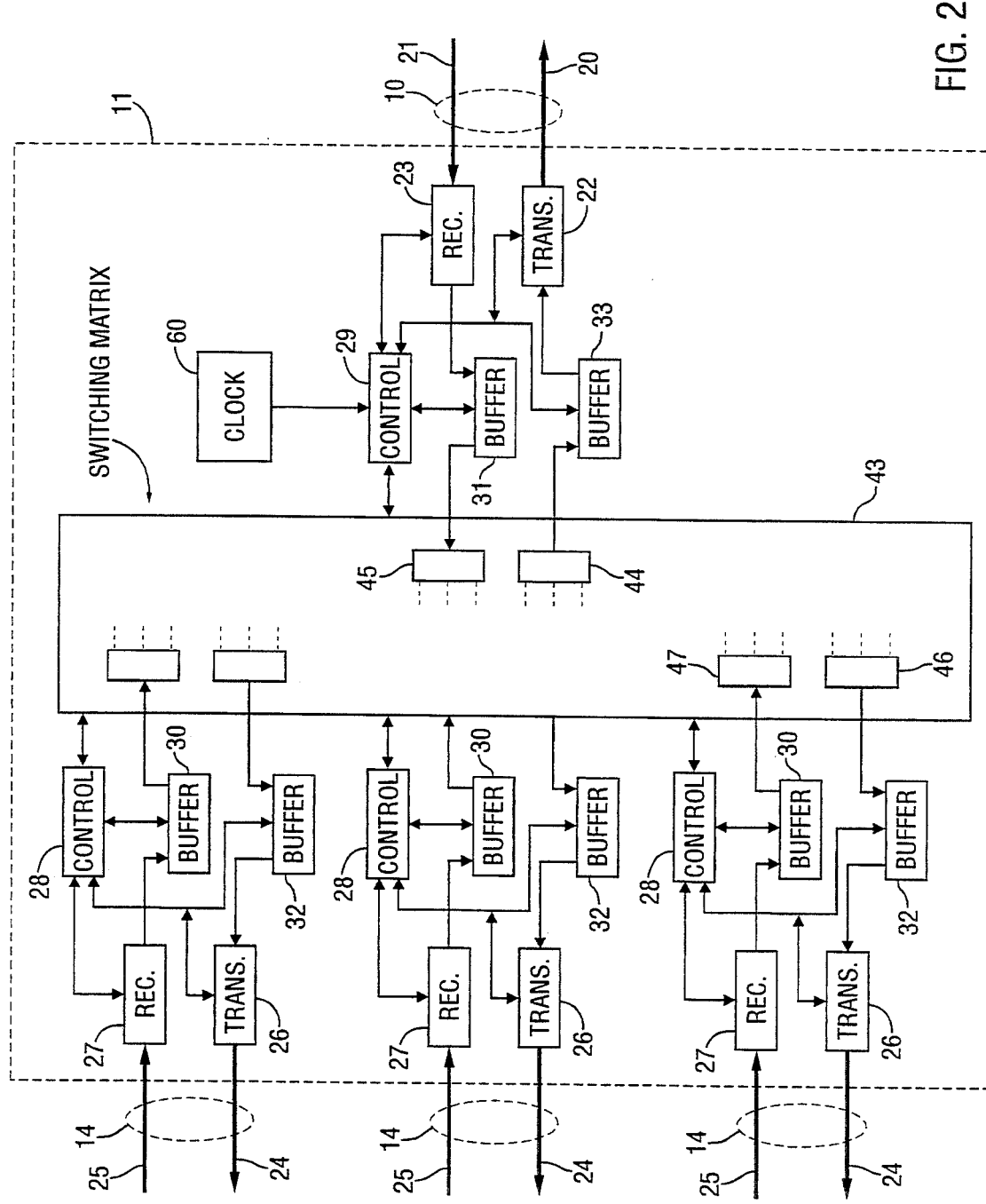
FIG. 2 is an electrical diagram in block form of one of the nodes in the network of FIG. 1.
Figure 3:
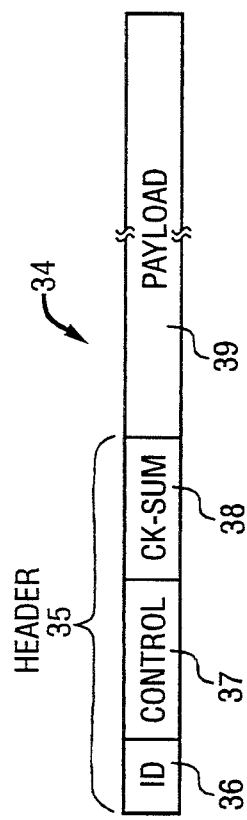
FIG. 3 is a diagram of the format of a packet which may be employed in some links of the network of FIG. 1.

Referring to FIG. 2, a typical construction of one of the nodes 11 or 12 is shown, and the nodes 13 and 15 may be similarly constructed. Although the node 11 of FIGS. 1 or 2 is illustrated to have three links 14 and one link 10 as the ingress and egress ports, it is understood that the node 11 may have many more ports than four. The link 10 has a transmit line 20 and a separate receive line 21, and these are connected to a transmitter 22 and a receiver 23, respectively, in the node 11. Similarly, each one of the links 14 has a transmit line 24 and a separate receive line 25, and again each of these is connected to a transmitter 26 or receiver 27, respectively. Although it is not necessarily the case, the link 10 in this example is of broader bandwidth (higher rate of transmission) than the links 14, so traffic is funneled into link 10 from several links 14. The function of the receivers 23 or 27 is to detect and demodulate the signal on the line 21 or 25, recover the clock, convert the serial data on the line to parallel data for loading into the receive buffers. The function of the transmitters 22 or 26 is to move data from a buffer in parallel format, convert the data from parallel to serial, modulate a carrier with the serial data, and send the data signal out on the transmit line 20 or 24. Each one of the ports for links 14 is operated by a controller 28, and the port for the link 10 is operated by a controller 29. These controllers are usually processors executing code stored in local memory, or may be state machines, or similar logic. A receive buffer 30 is provided for incoming data from the line 25 for each of the links 14, and likewise incoming data on the line 21 of the link 10 is buffered in a buffer 31. A transmit buffer 32 may also be provided for outgoing data on lines 24 for each link 14, as well as a transmit buffer 33 for the outgoing line 20 of the link 10. The controllers 28 or 29 are responsive to decoded command information in signals, cells or packets on the incoming lines 25 or 21 to activate the receivers 27 or 23 to start loading the respective buffers 30 or 31 with the incoming data, as well as to route the received data to be transmitted at one of the other ports. As seen in FIG. 3, a cell 34 by which information may be conveyed from a node 13 to the node 11 is illustrated. This cell 34 is delineated by the underlying service, or by some element within the header (i.e., the header checksum). The cell begins with a header 35 which includes a virtual channel identifier 36, a control area 37 and a header checksum 38 used to verify the integrity of the header and of the framing. The payload field 39 is the major part of the cell 34. The controller 28 for a port to a link 14 is responsive to the virtual channel identifier 36 to control the routing of the incoming cell through the switching network 43 to attempt to pass the cell from one port to another in order to effect the virtual channel between source and destination. The switching network 43 may include a multiplexer 44 to allow more than one link 14 to funnel into the link 10; likewise, a multiplexer 45 may allow simultaneous delivery of data from link 10 to more than one of the links 14. Similarly, the ports for links 14 may have multiplexers 46 and 47 so that data from or to multiple ports may be interleaved. Alternatively, the data may be interleaved by merely reading and writing between buffers 30-33 one word or more at a time via the switching circuit 43. In any event, a message frame is made up in transmit buffer 33, for example, by the controller 29, and this frame may contain interleaved packets or cells from many different terminals 17, going to many different terminals 18.

Figure 4:
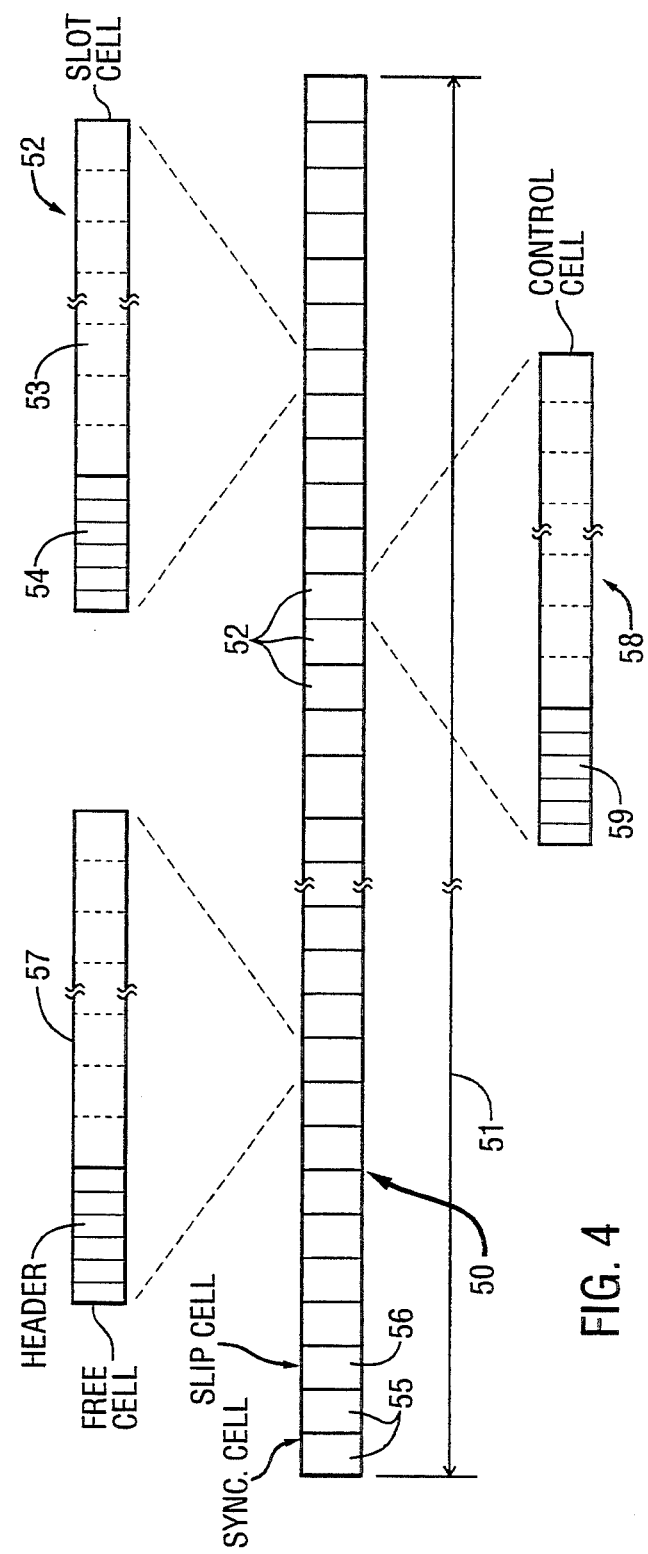
FIG. 4 is a timing diagram of the format of a frame or synchronized loop which may be employed in a long-delay link of the network of FIG. 1, according to a feature of the invention.

Referring to FIG. 4, a message frame 50 used for transmission on the link 10 is of fixed length 51 and is made up of a large number of slot cells 52. In an example embodiment, the slot cells 52 each contain fifty-three octets (424-bits), and there are 2119 cells in a frame 50 of 6-millisecond length 51, transmitted at a rate of about 150-Mbps. A slot cell 52 contains a data field 53 of 48-octets and a header 54 of five otters; the header includes a channel identifying number associated with a particular transmission from a source to a destination node. The first two cells of the frame 50 are sync cells 55; these sync cells delimit each frame 50 which is sent during a loop control period. At least two sync cells 55 are sent at the beginning of each frame. Sync cells are identified by a specific header address, and each contains a pointer to the first slot in the control period (i.e., the first data cell 52 in the frame) which follows sync and slip cells. (The second sync cell contains a pointer value of one lower than the first sync cell.) At least one slip cell 56 follows the sync cells; a slip cell contains no information, other than a header address identifying it as a slip cell. These slip cells exist only to be added or discarded, as required, to synchronize the two sides of a loop (in node 11 and node 12, for example) when they are not running at identical speeds. Typically one slip cell 56 is sent after the sync cell 55, but a second will be added, or the one will be deleted, as required. The slot cells 52 are the ones assigned to carry slotted traffic, each having a valid virtual channel identifier in its header 54. Slot cells are carried with priority over free cells, and are allocated using control cells. A free cell 57 is an unallocated cell, and may be empty, in which case its header carries a virtual channel identifier for an empty cell, or may carry traffic for which no slot is assigned; this unallocated traffic is carried on a best-effort basis and may be discarded in favor of slot cells when allocated traffic appears. Finally, a control cell 58 is one that carries information (control signals, commands, etc.) between the two ends of the loop, e.g., from node 11 to node 12. A control cell 58 is identified by a specific virtual channel identifier in its header 59 (which may be locally assigned). Control cells carry messages that indicate that a given time slot within the basic control period of the frame 50 has been assigned to carry traffic on behalf of a given virtual channel, or has been freed. A protocol is defined for sending these messages in control cells, and the controller 29 generates these cells for sending via transmitter 22.

The frames 50 are timed by a separate clock 60 in each node 11 or 12. These clocks are stable crystal oscillators which maintain sufficient accuracy to synchronize the repetition of frames 50 at each end of a link 10. Since the time period 51 of a frame 50 is some multiple of 6-millisecond, this level of accuracy is well within that of currently-available crystal oscillators, or other methods of establishing a stable time reference. The bit rate, about 150-Mbps (or 600-Mbps, depending upon the system), is established by the oscillator 60, and the octet cell and frame rates may be obtained by counting down from the bit rate clock, or from external synchronization sources, i.e., a network master clock.

Figure 5:
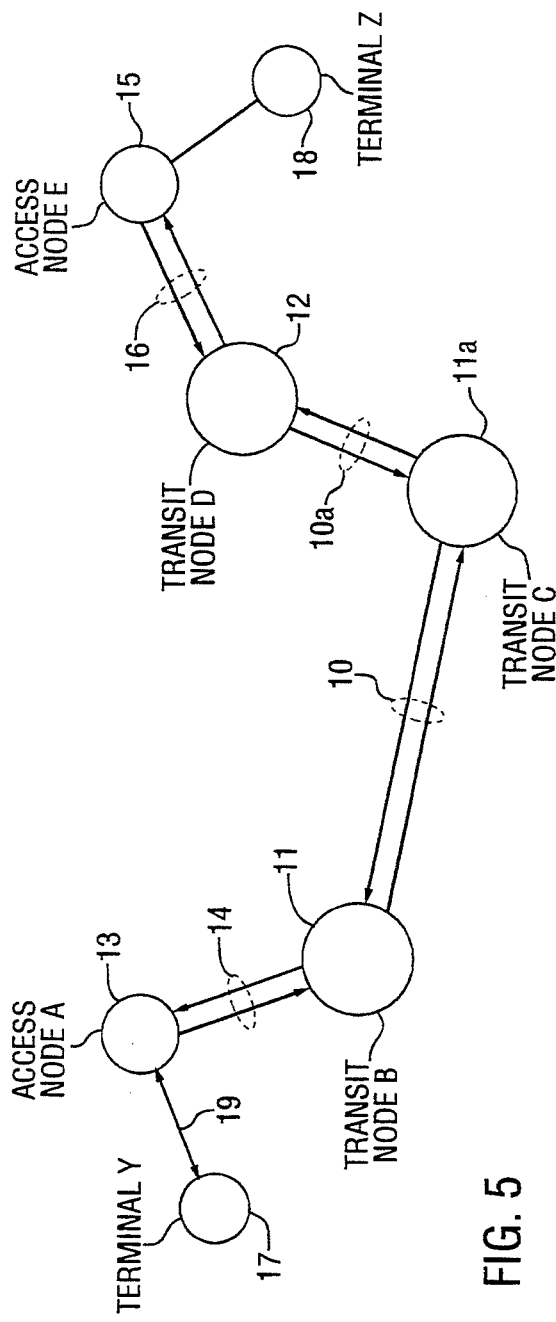
FIG. 5 is a diagram similar to FIG. 1 of a part of a network having two long-delay links.

Referring to FIG. 5, an example of connection establishment is illustrated where a seven-hop connection (including two local loops) is shown between two of the terminals 17 and 18, labelled Y and Z in this example. Nodes 11, 11a and 12 are of the type shown in FIGS. 1 and 2, using the frames of FIG. 4 in links 10 and 10a; the link 10 is assumed to have an 11-millisecond one-way propagation delay, synchronized at four base periods of 24-ms with 8192 slots 52 in a frame 50, while link 10a is assumed to have a 2-ms one-way propagation delay, synchronized at one base period of 6-ms with 2048 slots. No assumption is made that bandwidth is symmetrical; traffic is to be passed from Y to Z, without regard for traffic from Z to Y (which is handled separately). When the connection is requested by terminal Y, the network controller first identifies the path from Y to Z, determined here to be a path Y→A→B→C→D→E→Z. Links A-B and D-E, like the local loops Y-A and E-Z, are local and can maintain an acceptably low loss rate by using conventional local credit management techniques. Links B-C and C-D (like link 10 of FIG. 1) are longer and are phase-locked to one another and to the network master clock (or local synchronized clocks 60). Nodes B, C and D thus perform a phase-comparator function upon their plesiochronous transfer mode links so that a fixed mapping between slots in adjacent links is possible, using the frames 50 of FIG. 4.

Once the path Y-to-Z is identified, the network controller (i.e., one of the controllers 29) allocates the appropriate bandwidth along each link. The unsynchronized links such as A-B and D-E need merely to have sufficient bandwidth available. The phase-locked links B-C and C-D have slots 52 allocated to the virtual channel Y-Z. Slots are assigned as far apart within the loop period 51 as possible, in order to minimize funneling effects. The number of slots allocated in each link is based on the bandwidth required. A link whose loop control period is greater than the basic control period of 6-millisecond is treated as having multiple instances of the basic control period. Thus in the example, if the channel Y→Z requires a bandwidth of 256-kbps, then four slots are assigned in link C-D (which is operating at frame period of 6-ms.), each slot ideally following 512-slots after the previous one. The link B-C (which is operating at frame period of 24-ms.), however, requires sixteen slots assigned, again ideally 512-slots apart. If a link operated at a higher speed, the spacing between slots would remain uniform in time, and scaled in number of slots per frame. For example, if B-C were a 620 Mbps link, then it would have 32768 slots, and the sixteen slots in half-circuit Y→Z would be spaced 2048 slots apart.

After the slots are allocated by the network controller, the network controller signals to Y by a control packet or cell that it is ready to accept traffic. Access node A grants credits to Y, and in turn forwards the cells it receives from Y on to B when it receives sufficient credits from B. B in turn inserts the cells into the appropriate time slots in the frame 50 currently being sent by B onto link B-C; C does the same in relaying them to D. Link D-E, however, is controlled by a simple credit mechanism so D buffers the cells until E has granted the required credits, at which time it forwards them to E, who in turn relays them synchronously to Z.

Figure 6:
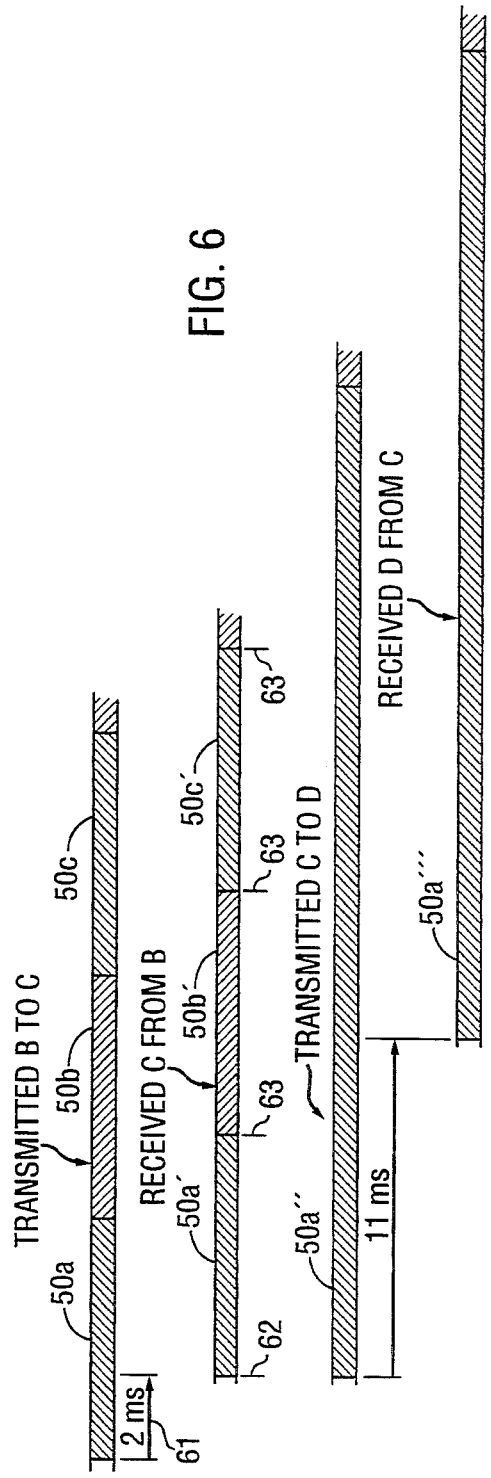
FIG. 6 is a timing diagram of a series of the frames of FIG. 4 transmitted by one node of FIG. 5 and received by another node.

Referring to FIG. 6, a data stream sent on link 10 from a node 11, for example, to the node 11a is a series of frames 50a, 50b, 50c, et seq., where each frame is of the format of FIG. 4. The actual propagation delay 61 in the link 10 between nodes 11 and 11a is less than the length 51 of each of the frames 50a, 50b, etc. The receiver in the node 11a is synchronized by its clock 60 to receive the frame 50a beginning at time 62, and subsequent frames at times 63 spaced by the period 51, in a continuous sequence. If the clocks 60 drift, .or the propagation delay drifts due to environmental factors, then there is some elasticity in the receive data buffers to account for such differences, while a drift of a cell length is accounted for adding or deleting slip cells 56. Drift of the order of magnitude of the bit rate (150- or 600-Mbps) or at the octet rate (18.75- or 75-M/sec.) is accounted for in the elasticity of the receive circuitry. The "phase-locking" referred to between transmitted and received frames is at slot level and frame level. Note that the slots or cells are phase locked between the various links in the network, and the frames are phase locked between a transmit-receive pair of nodes, but tile frames 50 may be of different length in link 10 compared to frames in link 10a.

According to a feature of the invention disclosed in copending application Ser. No. 509,605, filed herewith, U.S. Pat. No. 5,029,164, and assigned to Digital Equipment Corporation, a different allocation method may be used for bursty traffic. This secondary procedure, used only for bursty (variable bit rate) traffic, employs a form of "fast circuit" switching, in which virtual channels are varied in size in order to handle variations in offered load. Access nodes or terminals such as node A of FIG. 5 are expected to buffer traffic as it arrives, but when the buffer begins to fill, this originator node A may request a temporary increase in bandwidth sufficient to empty itself.

Figure 7:
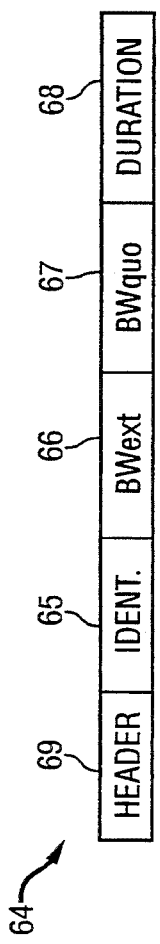
FIG. 7 is a timing diagram of an allocation request message used in the network of FIG. 1 or 5, according to a technique of copending application Ser. No. 509,605, filed herewith, U.S. Pat. No. 5,029,164.

All virtual channels such as the channel Y→Z have a residual bandwidth (BRes) which is available at all times; in the above example the residual bandwidth may be one slot per 512 slots, to be automatically allocated by the network controller whenever a request is made, without any exchange of signals between nodes 11 and 12. Additional bandwidth for a given virtual channel is requested by means of a bandwidth request descriptor which is a message packet or cell 64 as seen in FIG. 7, sent from the node 13 to the node 11, for example. This request descriptor message of course includes a field 65 to identify the source node and the destination node (or channel number) so that the path can be determined, and in addition has three elements, a BWext field 66, a BWquo field 67 and a duration field 68. The BWext field 66 specifies the requested bandwidth extension, and is a value representing the most that the network will grant for the duration of the descriptor. The network control facility determines what maximum bandwidth will ever be allotted to a terminal, depending upon the network configuration at the time, and sends this value to all nodes. The BWext field 66 is in the message 64 when it is sent by the originator to the network. The BWquo field 67 is the bandwidth extension quote, which is the amount that the network actually grants. This value is initially set by the originating terminal 13 to be equal to BWext but may be lowered by any of the intermediate nodes 11, 11a, 12, etc., before being returned to the originator by the network. The duration field 68 is the amount of time that the descriptor should remain in effect, which is ideally expressed as a number of cells. While a time-based descriptor could be used, it would have to be extended by the network if the request BWext were reduced to a lower BWquo, since it would take longer to send the pending traffic.

Every node within a network such as that of FIG. 5 also determines, at connection establishment, the total end-to-end transit delay across the network and its own relative position within the link (i.e., how many ms. from each end). When a bandwidth request descriptor 64 is issued, this procedure is followed: (1.) The originator (e.g., node 13) sends a bandwidth descriptor 64 across the link towards the destination terminal Z. This cell 64 is identified as a user-to-network cell by its header 69. (2.) As the cell 64 travels towards the destination (using the transport mechanism of FIG. 5, for example), each node 11, 11a 12, etc., determines how much of the requested bandwidth in BWext it can provide exactly one round-trip interval hence. If it cannot provide at least as much as the current BWquo in field 67 (which is being marked down as the descriptor 64 travels towards the destination), it puts a new value in BWquo field 67. No node may raise the value in BWquo field 67 as the cell 64 traverses the network. (3.) At the egress node (E in FIG. 5), the descriptor 64 is returned along the same path by which it arrived. Each node (12, 11a, 11, etc.) on the return path notes the remaining (marked down)value of the BWquo field 67, but does not further change it; this value is stored in a table of all current traffic, identified by the channel number in the field 65, so that the controller 29 can check subsequent slotted cells for validity and also keep track of allocated capacity when making allocation for subsequent requests 64. (4.) When the descriptor 64 returns to its originator node 13, the bandwidth described in BWquo field 67 becomes available for immediate use by the terminal Y, for the time period of the duration field 68.

The concept of a virtual path instead of a virtual channel may be used to minimize node complexity. The total number of virtual channels between any two nodes such as Y and Z in a network is likely to frequently exceed one, e.g., when more than one message is pending. Some economization may take place by allocating slots 52 to virtual paths instead of virtual channels. There may be only one virtual path between two nodes Y and Z. A virtual path, in this case, is a special form of channel that contains within itself multiple user virtual channels. The total number of virtual paths within a network is thus limited to the square of the number of nodes, regardless of the number of virtual channels requested by users. Access nodes can map each virtual channel into the appropriate virtual path, and intermediate nodes need only keep track of virtual paths (as well as any virtual channels that are locally terminated).

Figure 8:
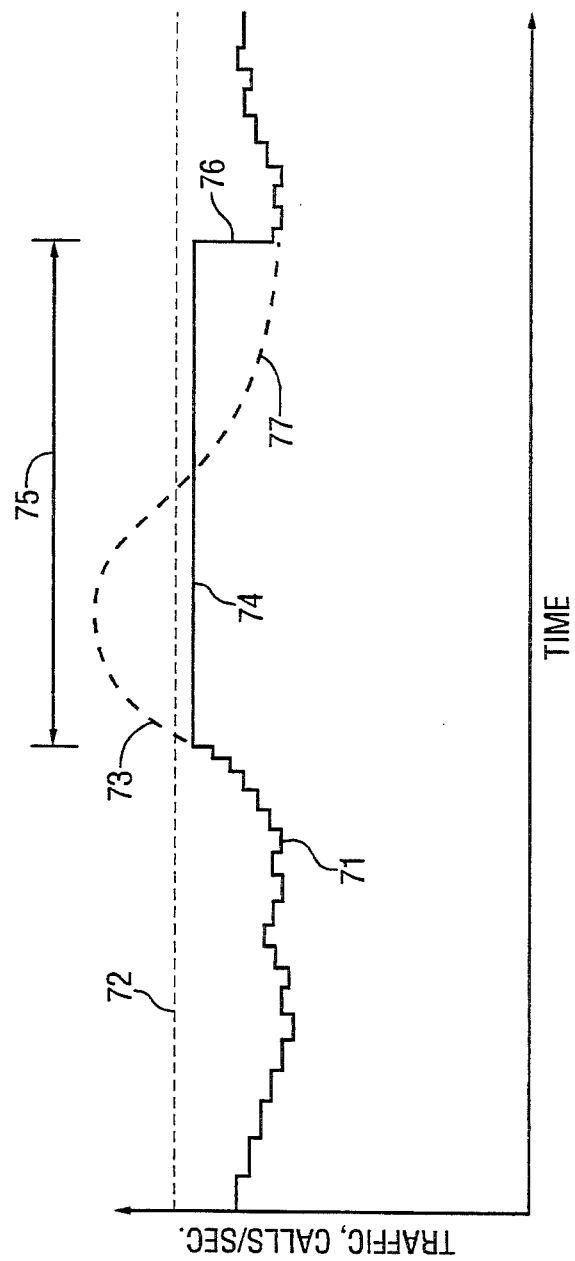
FIG. 8 is a diagram of message traffic as a function of time in a system of FIGS. 1 or 5.

Referring to FIG. 8, a chart of the allocated traffic in one link 10, for example, as a function of time, shows that as the number of requested allocations from the remote nodes changes the allocated traffic level follows a line 71, rising and falling as the requests ebb and flow. A line 72 represents the limit imposed by the capacity of the link, determined by the physical construction, software, etc. During a peak in traffic, when the requested allocations from the remote terminals tend to exceed the limit 72 to follow the line 73, the controller imposes reduced (instead of requested) allocations on all remotes so the real traffic follows the line 74, below the limit 72, instead of the line 73. All network traffic is at a lower level than requested for a time period 75, until the line 76 rejoins the request curve 77 when all delayed requests have been made up. In this manner, network congestion during the peak period 75 is merely exhibited to the remote terminals as a slowing of the apparent response of the network, rather than as loss of data requiring retransmitting sequences of messages. Retransmission occurrences not only markedly reduce the apparent speed of the network from the terminals standpoint, but also reduce the real capacity of the network since traffic is transmitted more than once.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A communication network having a plurality of data links between nodes, comprising:

a transmitter in one of said nodes of said network and sending repetitive transmitted data frames to one of said links, said transmitted data frames being of fixed length which is an integral multiple of a basic control period consisting of a time greater than the period of a propagation delay over a shortest one of said links; and each of said transmitted data frames being in a frame format containing a number of data cells, each data cell containing identification of a virtual channel and data for a message transmitted for said virtual channel;

a receiver in another of said nodes of said network and receiving said repetitive transmitted data frames, said receiver being synchronized with said transmitted data frames by clocked cell periods generated at said receiver, said clocked cell periods being of the same timing as said cells of said transmitted data frames, and said receiver receiving data in said transmitted data frames for forwarding on other of said data links according to said identification of said virtual channels.

2. A network according to claim 1 wherein nodes at each end of said one link have buffers and said propagation delay is longer than the fill time of said buffers at the transmission rate of said link.

3. A network according to claim 1 wherein said link is a serial fibre optic link.

4. A network according to claim 1 wherein said transmitter funnels messages from a number of said nodes into said link.

5. A network according to claim 1 wherein each said frame of fixed length contains a plurality of said cells for said virtual channel.

6. A network according to claim 1 wherein each of said transmitted frames contains a plurality of slip cells for adding or omitting time periods for synchronizing said receiver with said transmitted data frames.

7. A network according to claim 1 wherein a selected portion of said number of cells of each said repetitive frame is allotted to each said virtual channel according to the number of virtual channels being transmitted.

8. A communication network having a first link between first and second nodes and a second link between said second node and a third node, comprising:

said first node having a first transmitter sending repetitive transmitted frames to said first link, said second node having a second transmitter sending said repetitive transmitted frames to said second link, said frames for said first and second transmitters being of fixed length greater than the period of a propagation delay over a shortest one of said first and second links, and each one of said transmitted frames containing a number of cells in a data frame format, each cell containing identification of a virtual channel and information for a message transmitted for said virtual channel;

said second node having a first receiver receiving said repetitive transmitted frames from said first transmitter, said third node having a second receiver receiving said repetitive transmitted frames from said second transmitter, said first receiver being synchronized with said first transmitter by generating in said first receiver a plurality of clocked cells, said plurality of clocked cells corresponding to said number of cells in said data frame format, said repetitive transmitted frames containing information in said number of cells for forwarding by said first receiver on said second link according to said identification of said virtual channels.

9. A method of transmitting dam wherein messages from a first group of terminals are funneled through first and second intermediate nodes to a second group of terminals in a network, using time-division multiplexing, comprising the steps of:

a) transmitting from said first intermediate node and receiving at said second intermediate node repetitive message frames having a frame period which is greater than an integral multiple of the time of propagation of signals from said first to said second intermediate nodes; a link between said first and second intermediate nodes being shorter than any other link between nodes in said network:
b) inserting dam cells from said messages in time slots in said message frames at said first intermediate node, with identification of the messages;
c) allocating said time slots to said messages on a dynamic basis depending upon the number of said messages to be transmitted.

10. A method according to claim 9 including the step of synchronizing a receiver at said second intermediate node with said frame period by a clock at said second intermediate node.

11. A method according to claim 9 including a third intermediate node, and including the steps of:
transmitting from said second intermediate node and receiving at said third intermediate node repetitive message frames having a time period which is an integral multiple of said frame period; and
inserting cells from said messages in time slots in said message frames at said second intermediate node.

12. A method according to claim 9 wherein each said message frame of fixed length contains a plurality of said cells for a given one of said messages.

13. A method according to claim 9 wherein said transmission is by a serial link.

14. A method according to claim 13 wherein said serial link is a fibre optic link.

15. A method of transmitting information in a network wherein messages from a first group of terminals are funneled through first and second intermediate nodes of said network to a second group of terminals, using time-division multiplexing, comprising the steps of:
a) transmitting on said network from said first intermediate node and receiving at said second intermediate node repetitive message frames having a fixed frame period greater than the time of propagation of signals from said first to said second intermediate nodes; wherein said first and second intermediate nodes have data buffers and said time of propagation is longer than the fill time of said data buffers at the transmission rate of said frames;
b) inserting cells from said messages in time slots in said message frames at said first intermediate node, with identification of the messages;
c) allocating said time slots to said messages on a dynamic basis depending upon the number of said messages to be transmitted.

16. A method of transmitting data in a network, comprising the steps of:
a) creating at a node in said network a repetitive message frame having a number of time slots and transmitting said repetitive message frame in said network between first and second intermediate nodes of said network, said message frame having a length which is greater than an integral multiple of a basic period representing the time for transmission in saint network from said first to said second node;
b) synchronizing the starting point and said slots of said repetitive message frame at said second intermediate node with the starting point and said slots of said repetitive message frame at said first intermediate node;
c) inserting in said slots data for messages being sent from remote terminals via said first intermediate node to said second intermediate node for forwarding to other remote terminals in said network;
d) labelling each of said slots with an identification of the messages for which data is inserted in said slots; and
e) allotting a number of said slots in each of said message frames in accordance with the number of said messages.

17. A method of transmitting data in a network, comprising the steps of:
a) creating at a first node of said network a repetitive message frame having a number of time slots and transmitting said repetitive message frame between first and second intermediate nodes of said network, said message frame having a length greater thorn the round trip time for transmission from said first to said second node and return to said first node; wherein said first and second intermediate nodes have data buffers and said round trip time is longer than the fill time of said data buffers at the transmission rate of said message frames;
b) synchronizing the starting point and said slots of said repetitive message frame at said second intermediate node with the starting point and said slots of said repetitive message frame at said first intermediate node;
c) inserting in said slots data for messages being sent from remote terminals via said first intermediate node to said second intermediate node for forwarding to other remote terminals of said network;
d) labelling each of said slots with an identification of the messages for which data is inserted in said slots; and
e) allotting a number of said slots in each of said message frames in accordance with the number of said messages.

* * * * *